United States Patent
Yamaji et al.

(10) Patent No.: US 11,336,161 B2
(45) Date of Patent: May 17, 2022

(54) ROTATING ELECTRIC MACHINE AND METHOD OF MANUFACTURING SAME

(71) Applicant: DENSO CORPORATION, Kariya (JP)

(72) Inventors: Manabu Yamaji, Kariya (JP); Atsuo Ishizuka, Kariya (JP); Shinpei Fujiwara, Nisshin (JP)

(73) Assignee: DENSO CORPORATION, Kariya (JP)

( * ) Notice: Subject to any disclaimer, the term of this patent is extended or adjusted under 35 U.S.C. 154(b) by 346 days.

(21) Appl. No.: 16/712,197

(22) Filed: Dec. 12, 2019

(65) Prior Publication Data

US 2020/0195108 A1  Jun. 18, 2020

(30) Foreign Application Priority Data

Dec. 12, 2018 (JP) .............................. JP2018-232749

(51) Int. Cl.
*H02K 15/085* (2006.01)
*H02K 3/12* (2006.01)
(Continued)

(52) U.S. Cl.
CPC .............. *H02K 15/085* (2013.01); *H01B 3/30* (2013.01); *H02K 1/18* (2013.01); *H02K 3/12* (2013.01); *H02K 3/28* (2013.01); *H02K 3/30* (2013.01); *H02K 3/38* (2013.01); *H02K 5/08* (2013.01); *H02K 5/10* (2013.01); *H02K 15/12* (2013.01)

(58) Field of Classification Search
CPC .......... H02K 15/085; H02K 1/18; H02K 3/12; H02K 3/28; H02K 3/30; H02K 3/38; H02K 5/08; H02K 5/10; H02K 15/12; H02K 1/185; H02K 3/02; H02K 2213/03;
(Continued)

(56) References Cited

U.S. PATENT DOCUMENTS 6,940,382 B2 * 9/2005 Ishikawa ............... H01F 27/327
336/90
2001/0040418 A1 * 11/2001 Higashino ................ H02K 9/06
310/263
(Continued)

FOREIGN PATENT DOCUMENTS

| JP | 2012161153 | * | 8/2012 |
| JP | 2013115832 | * | 6/2013 |
| JP | 2016-134991 A | | 7/2016 |

*Primary Examiner* — Ahmed Elnakib
(74) *Attorney, Agent, or Firm* — Oliff PLC (57) ABSTRACT

A rotating electric machine includes a stator core, a stator coil formed of electrical conductors and insulating coats respectively covering the electrical conductors, and an encapsulating resin body. The stator coil has a coil end part protruding from the stator core. The coil end part includes exposed portions of the electrical conductors, which are exposed from the insulating coats, joints formed at the exposed portions, and covered portions of the electrical conductors which are covered with the respective insulating coats and respectively adjoin the exposed portions. The encapsulating resin body has a first part in which the exposed portions of the electrical conductors and the joints are encapsulated, and a second part in which at least part of each of the covered portions of the electrical conductors is encapsulated. A coefficient of linear expansion of the first part is lower than a coefficient of linear expansion of the second part.

9 Claims, 6 Drawing Sheets

(51) Int. Cl.
    *H02K 3/30*     (2006.01)
    *H02K 1/18*     (2006.01)
    *H01B 3/30*     (2006.01)
    *H02K 3/28*     (2006.01)
    *H02K 3/38*     (2006.01)
    *H02K 15/12*    (2006.01)
    *H02K 5/08*     (2006.01)
    *H02K 5/10*     (2006.01)

(58) Field of Classification Search
    CPC . H02K 3/14; H02K 3/50; H02K 7/006; H01B 3/30
    USPC .......................................... 310/208, 43, 45
    See application file for complete search history.

(56) References Cited

U.S. PATENT DOCUMENTS

| | | | |
|---|---|---|---|
| 2012/0223599 A1* | 9/2012 | Nakamura | H02K 15/12 310/45 |
| 2014/0084713 A1* | 3/2014 | Kurahara | H02K 15/12 310/45 |
| 2016/0190891 A1* | 6/2016 | Masugi | H02K 3/38 310/201 |
| 2017/0257002 A1 | 9/2017 | Ishizuka et al. | |
| 2019/0097484 A1* | 3/2019 | Kaneshige | H02K 3/48 |
| 2020/0195108 A1* | 6/2020 | Yamaji | H02K 3/28 |

* cited by examiner

ROTATING ELECTRIC MACHINE AND METHOD OF MANUFACTURING SAME

CROSS-REFERENCE TO RELATED APPLICATION

This application is based on and claims priority from Japanese Patent Application No. 2018-232749 filed on Dec. 12, 2018, the contents of which are hereby incorporated by reference in their entirety into this application.

BACKGROUND

1 Technical Field

The present disclosure relates to rotating electric machines and methods of manufacturing the rotating electric machines.

2 Description of Related Art

There is known a rotating electric machine in which exposed portions of electrical conductors, which are exposed from insulating coats respectively covering the electrical conductors, are encapsulated in an encapsulating resin body. Specifically, the encapsulating resin body is formed with a curable resin. The encapsulating resin body has integrally encapsulated therein the exposed portions of the electrical conductors, joints formed at the exposed portions, and part of each of covered portions of the electrical conductors which are covered with the respective insulating coats and respectively adjoin the exposed portions.

SUMMARY

According to the present disclosure, there is provided a first rotating electric machine which includes: a stator core; a stator coil mounted on the stator core and formed of electrical conductors and insulating coats respectively covering the electrical conductors; and an encapsulating resin body having part of the stator coil encapsulated therein. The stator coil has a coil end part protruding from an axial end face of the stator core. The coil end part includes exposed portions of the electrical conductors, which are exposed from the insulating coats, joints formed at the exposed portions of the electrical conductors, and covered portions of the electrical conductors which are covered with the respective insulating coats and respectively adjoin the exposed portions. The encapsulating resin body is formed, at the coil end part of the stator coil, to integrally encapsulate therein the exposed portions of the electrical conductors, the joints formed at the exposed portions, and at least part of each of the covered portions of the electrical conductors. The encapsulating resin body has a first part in which the exposed portions of the electrical conductors are encapsulated and a second part in which the at least part of each of the covered portions of the electrical conductors is encapsulated. A coefficient of linear expansion of the first part of the encapsulating resin body is lower than a coefficient of linear expansion of the second part of the encapsulating resin body.

According to the present disclosure, there is also provided a second rotating electric machine which includes: a stator core; a stator coil mounted on the stator core and formed of electrical conductors and insulating coats respectively covering the electrical conductors; and an encapsulating resin body having part of the stator coil encapsulated therein and including a filler. The stator coil has a coil end part protruding from an axial end face of the stator core. The coil end part includes exposed portions of the electrical conductors, which are exposed from the insulating coats, joints formed at the exposed portions of the electrical conductors, and covered portions of the electrical conductors which are covered with the respective insulating coats and respectively adjoin the exposed portions. The encapsulating resin body is formed, at the coil end part of the stator coil, to integrally encapsulate therein the exposed portions of the electrical conductors, the joints formed at the exposed portions, and at least part of each of the covered portions of the electrical conductors. The encapsulating resin body has a first part in which the exposed portions of the electrical conductors are encapsulated and a second part in which the at least part of each of the covered portions of the electrical conductors is encapsulated. The percentage content of the filler in the first part of the encapsulating resin body is higher than the percentage content of the filler in the second part of the encapsulating resin body.

According to the present disclosure, there is further provided a method of manufacturing a rotating electric machine. The method includes the steps of: (1) mounting a stator coil to a stator core so that a coil end part of the stator coil protrudes from an axial end face of the stator core, the stator coil being formed of electrical conductors and insulating coats respectively covering the electrical conductors, the coil end part of the stator coil including exposed portions of the electrical conductors, which are exposed from the insulating coats, joints formed at the exposed portions of the electrical conductors, and covered portions of the electrical conductors which are covered with the respective insulating coats and respectively adjoin the exposed portions; (2) immersing at least part of the coil end part of the stator coil in a liquid resin so that the exposed portions of the electrical conductors and the joints formed at the exposed portions are immersed in a first part of the liquid resin while at least part of each of the covered portions of the electrical conductors is immersed in a second part of the liquid resin, the liquid resin having a filler added thereto and being contained in a container that has an opening; and (3) curing the liquid resin, at a time point after a predetermined duration has elapsed from the immersing step, to form an encapsulating resin body in which the at least part of the coil end part of the stator coil is encapsulated, at the time point, distribution of the filler in the liquid resin having become uneven so that an amount of the filler included in the first part of the liquid resin is greater than an amount of the filler included in the second part of the liquid resin.

DESCRIPTION OF EMBODIMENTS

In the above-described rotating electric machine known in the art (see, for example, Japanese Patent Application Publication No. JP2016134991A), the encapsulating resin body includes a first part in which the exposed portions of the electrical conductors are encapsulated, and a second part in which the covered portions of the electrical conductors are encapsulated. The electrical conductors are different in coefficient of linear expansion from the insulating coats respectively covering them. Consequently, there may occur cracking of the joints due to thermal stress induced by the difference in coefficient of linear expansion between the electrical conductors and the encapsulating resin body and/or peeling at interfaces between the insulating coats and the encapsulating resin body due to thermal stress induced by the difference in coefficient of linear expansion between the insulating coats and the encapsulating resin body. As a result, the reliability of the rotating electric machine may be lowered.

In contrast, in the above-described first rotating electric machine according to the present disclosure, the coefficient of linear expansion of the first part of the encapsulating resin body is set to be lower than the coefficient of linear expansion of the second part of the encapsulating resin body. Setting the coefficients of linear expansion of the first and second parts of the encapsulating resin body as above, it is possible to minimize the difference between the coefficient of linear expansion of the first part of the encapsulating resin body and the coefficient of linear expansion of the electrical conductors; it is also possible to minimize the difference between the coefficient of linear expansion of the second part of the encapsulating resin body and the coefficient of linear expansion of the insulating coats. Consequently, it is possible to minimize thermal stress that is induced by the difference in coefficient of linear expansion between the first part of the encapsulating resin body and the exposed portions of the electrical conductors and acts on the joints formed at the exposed portions of the electrical conductors; it is also possible to minimize thermal stress that is induced by the difference in coefficient of linear expansion between the second part of the encapsulating resin body and the insulating coats and acts on the interfaces therebetween. As a result, it is possible to suppress cracks from occurring in the joints; it is also possible to suppress peeling of the second part of the encapsulating resin body from the insulating coats. Accordingly, it is possible to ensure high reliability of the first rotating electric machine.

In the above-described second rotating electric machine according to the present disclosure, the percentage content of the filler in the first part of the encapsulating resin body is higher than the percentage content of the filler in the second part of the encapsulating resin body. The coefficient of linear expansion of the encapsulating resin body decreases with increase in the percentage content of the filler in the encapsulating resin body. Therefore, with the above distribution of the filler in the encapsulating resin body, it is possible to minimize the difference between the coefficient of linear expansion of the first part of the encapsulating resin body and the coefficient of linear expansion of the electrical conductors; it is also possible to minimize the difference between the coefficient of linear expansion of the second part of the encapsulating resin body and the coefficient of linear expansion of the insulating coats. Consequently, it is possible to minimize thermal stress that is induced by the difference in coefficient of linear expansion between the first part of the encapsulating resin body and the exposed portions of the electrical conductors and acts on the joints formed at the exposed portions of the electrical conductors; it is also possible to minimize thermal stress that is induced by the difference in coefficient of linear expansion between the second part of the encapsulating resin body and the insulating coats and acts on the interfaces therebetween. As a result, it is possible to suppress cracks from occurring in the joints; it is also possible to suppress peeling of the second part of the encapsulating resin body from the insulating coats. Accordingly, with the above configuration, it is possible to ensure high reliability of the second rotating electric machine.

In addition, in the second rotating electric machine according to the present disclosure, since the difference in coefficient of linear expansion between the first and second parts of the encapsulating resin body is realized by uneven distribution of the filler in the encapsulating resin body, it is possible to form both the first and second parts of the encapsulating resin body with the same resin material. Consequently, it is possible to simplify the constitution of the encapsulating resin body, thereby lowering the manufacturing cost.

With the above-described manufacturing method according to the present disclosure, the liquid resin is cured in a state where the amount of the filler included in the first part of the liquid resin is greater than the amount of the filler included in the second part of the liquid resin. Consequently, the percentage content of the filler in a first part of the resultant encapsulating resin body is higher than the percentage content of the filler in a second part of the resultant encapsulating resin body. In the first part of the encapsulating resin body, there are encapsulated the exposed portions of the electrical conductors and the joints formed at the exposed portions; in the second part of the encapsulating resin body, there is encapsulated at least part of each of the covered portions of the electrical conductors. As a result, with the above uneven distribution of the filler in the encapsulating resin body, it is possible to minimize both thermal stress acting on the joints formed at the exposed portions of the electrical conductors and thermal stress acting on the interfaces between the second part of the encapsulating resin body and the insulating coats. Accordingly, with the above method, it is possible to manufacture a rotating electric machine which has high reliability.

Exemplary embodiments will be described hereinafter with reference to FIGS. 1-10. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 1:
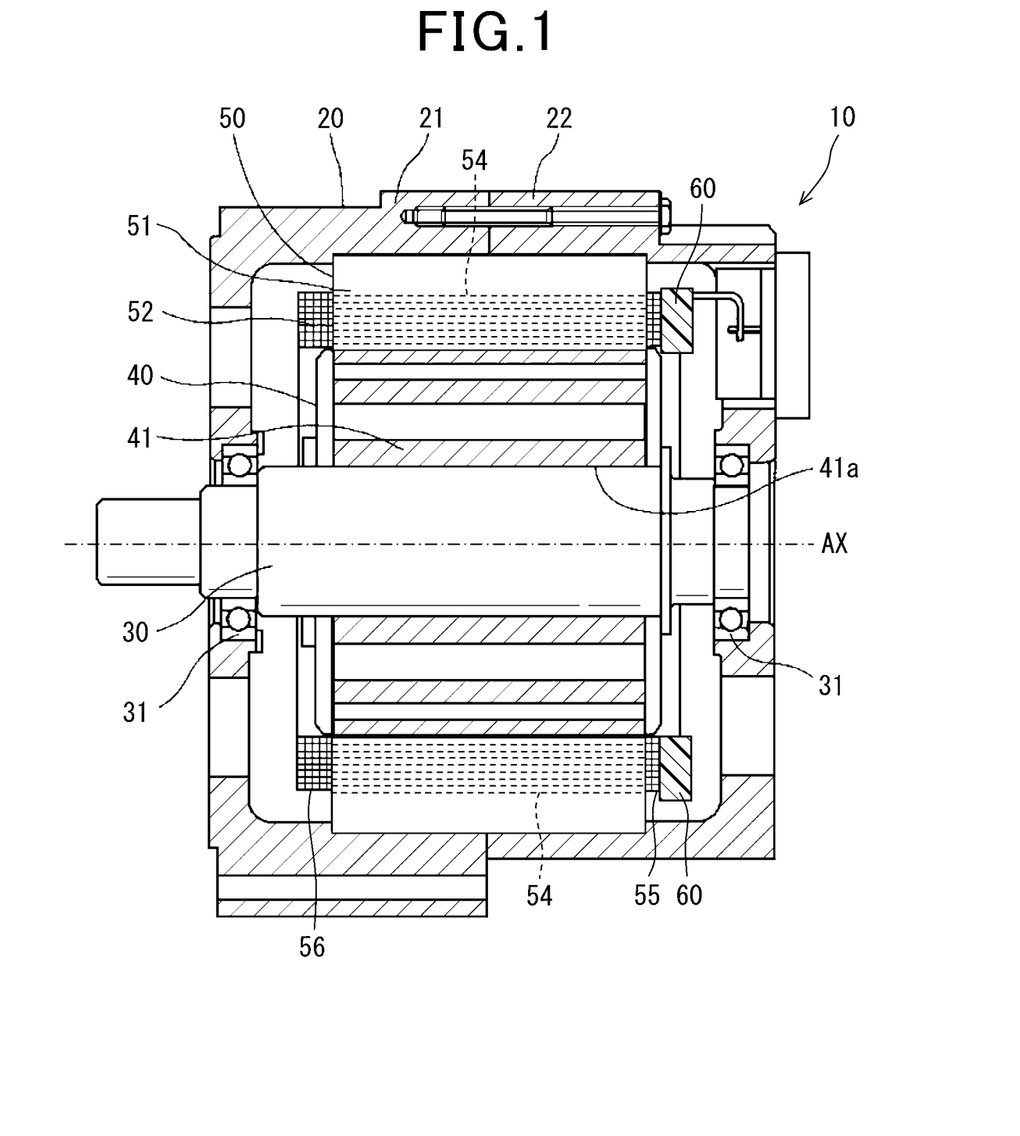
FIG. 1 is a cross-sectional view of a rotating electric machine according to a first embodiment.

FIG. 1 shows the overall configuration of a rotating electric machine 10 according to the first embodiment.

In the present embodiment, the rotating electric machine 10 is configured as a motor-generator for use in, for example, an electric vehicle or a hybrid vehicle. Specifically, upon being supplied with electric power from a battery (not shown) of the vehicle, the rotating electric machine 10 functions as an electric motor to generate torque (or driving force) for driving the vehicle. Otherwise, upon being supplied with torque from an engine (not shown) or wheels (not shown) of the vehicle, the rotating electric machine 10 functions as an electric generator to generate electric power for charging the battery.

To the rotating electric machine 10, there is electrically connected a control device (not shown). The control device includes an electric power conversion circuit. When the rotating electric machine 10 functions as an electric motor, the control device supplies the rotating electric machine 10 with multi-phase AC power, more particularly with three-phase AC power in the present embodiment. More specifically, the control device converts DC power supplied from the battery into three-phase AC power and supplies the resultant three-phase AC power to the rotating electric machine 10. On the other hand, when the rotating electric machine 10 functions as an electric generator, the control device rectifies three-phase AC power outputted from the rotating electric machine 10 into DC power and charges the battery with the resultant DC power.

As shown in FIG. 1, the rotating electric machine 10 includes a housing 20, a rotating shaft 30, a rotor 40, a stator 50 and an encapsulating resin body 60. The rotor 40 is configured to be rotatable about an axis AX. The stator 50 is shaped in a hollow cylinder whose axis coincides with the axis AX. In addition, the terms "axial direction", "radial direction" and "circumferential direction" used hereinafter are defined with respect to the axis AX.

The housing 20 has the stator 50 fixed thereto and rotatably supports the rotor 40. The housing 20 may constitute part of a component of the engine of the vehicle. For example, the housing 20 may constitute part of a crankcase or part of a transmission case. The housing 20 is composed of a first housing 21 and a second housing 22 both of which are formed in a bottomed cylindrical shape. Both the rotor 40 and the stator 50 are received in the housing 20, i.e., received between the first and second housings 21 and 22.

The rotating shaft 30 is made of a metal material and is substantially cylindrical in shape. The rotating shaft 30 is supported by the housing 20 via a pair of bearings 31 so that it can rotate about the axis AX.

The rotor 40 is fixed on the rotating shaft 30 so as to rotate together with the rotating shaft 30. The rotor 40 is magnetically coupled with the stator 50. Specifically, the rotor 40 generates torque upon magnetic flux, which is generated by the stator 50, crossing the rotor 40. Moreover, the rotor 40 also generates magnetic flux. When the rotor 40 is rotated by torque supplied from, for example, the engine of the vehicle, the magnetic flux generated by the rotor 40 crosses a stator coil 52 of the stator 50, inducing three-phase alternating current in the stator coil 52.

The rotor 40 includes a rotor core 41 that is made of a magnetic material and cylindrical in shape. The rotor core 41 constitutes part of a magnetic circuit formed in the rotating electric machine 10. The rotor core 41 has a circular through-hole 41a formed in a central part thereof. The rotating shaft 30 is fixedly fitted in the through-hole 41a so that the rotor 40 can rotate together with the rotating shaft 30. The rotor core 41 is located radially inside the stator 50. That is, the rotating electric machine 10 according to the present embodiment has an inner rotor structure. The rotor core 41 has a plurality of magnetic poles arranged in the circumferential direction. The magnetic poles may be formed by a plurality of permanent magnets embedded in the rotor core 41 or fixed on a radially outer peripheral surface of the rotor core 41. More particularly, in the present embodiment, the magnetic poles are formed by a plurality of permanent magnets fixed on the radially outer peripheral surface of the rotor core 41.

Figure 2:
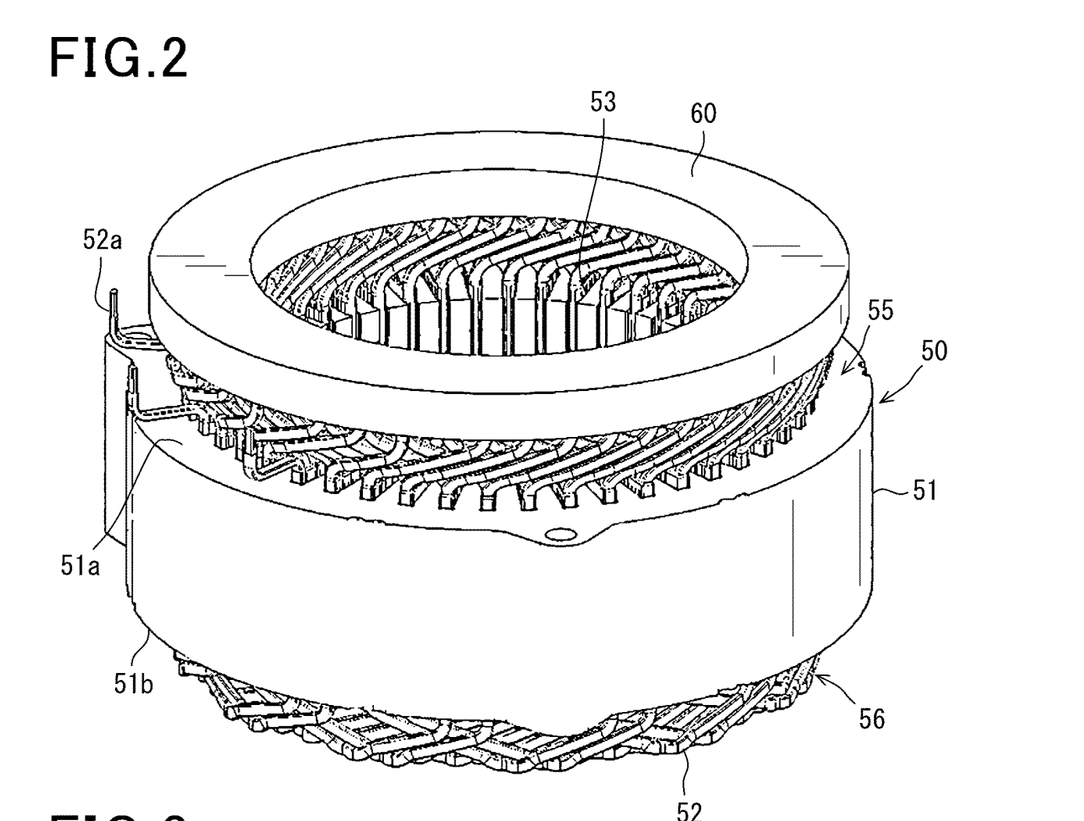
FIG. 2 is a perspective view of a stator of the rotating electric machine.

Referring now to FIG. 2 together with FIG. 1, the stator 50 includes a stator core 51 and the aforementioned stator coil 52.

The stator core 51 is made of a magnetic material and is hollow cylindrical (or annular) in shape. The stator core 51 constitutes part of the magnetic circuit formed in the rotating electric machine 10. In the present embodiment, the stator core 51 is formed by laminating a plurality of steel sheets in the axial direction.

The stator core 51 has a plurality of slots 53 arranged at equal intervals in the circumferential direction. Alternatively, the slots 53 may be arranged at different intervals in the circumferential direction. Each of the slots 53 is formed to extend in the axial direction so as to penetrate all the steel sheets forming the stator core 51. Moreover, each of the slots 53 extends in a radial direction as well. Typically, the stator core 51 has an annular back core and a plurality of teeth each extending radially inward from the back core and spaced from one another in the circumferential direction. Each of the slots 53 is formed between one circumferentially-adjacent pair of the teeth.

The stator coil 52 generates magnetic flux upon being energized. Otherwise, the stator coil 52 generates three-phase alternating current upon the magnetic flux, which is generated by the rotor 40, crossing the stator coil 52. The stator coil 52 is comprised of three phase coils, i.e., a U-phase coil, a V-phase coil and a W-phase coil. The U-phase, V-phase and W-phase coils are star-connected to define a neutral point therebetween.

The stator coil 52 is mounted on the stator core 51. The stator coil 52 has a plurality of coil sides 54 and a pair of first and second coil end parts 55 and 56. Each of the coil sides 54 extends straight in the axial direction and is received in a corresponding one of the slots 53 of the stator core 51. The first and second coil end parts 55 and 56 are respectively located on opposite axial sides of the stator core 51. Specifically, the stator core 51 has a pair of first and second axial end faces 51a and 51b. The first coil end part 55 protrudes axially outward from the first axial end face 51a of the stator core 51. The second coil end part 56 protrudes axially outward from the second axial end face 51b of the stator core 51.

Each of the first and second coil end parts 55 and 56 can be regarded as an assembly of electrical conductors connecting the coil sides 54. That is, at each of the first and second coil end parts 55 and 56, each electrical conductor connects two coil sides 54 respectively received in two different slots 53. Each of the phase coils of the stator coil 52 has a neutral terminal and a connection terminal 52a. The neutral terminals of the phase coils are connected together at the neutral point of the stator coil 52. The connection terminals 52a of the phase coils are connected to the control device via respective busbars (not shown). In addition, in the present embodiment, the connection terminals 52a of the phase coils are located on the same axial side of the stator core 51 as the first coil end part 55.

Each of the phase coils may be formed by joining a plurality of substantially U-shaped or substantially I-shaped electrical conductor segments. Moreover, the electrical conductor segments may be joined by various joining methods, such as welding (a joining method in which the base metals are melted) or brazing (a joining method in which a filler metal is melted to join the base metals with wettability).

In addition, each of the phase coils may include a plurality of coil units that are different in electrical angle from each other and electrically connected with each other.

Figure 3:
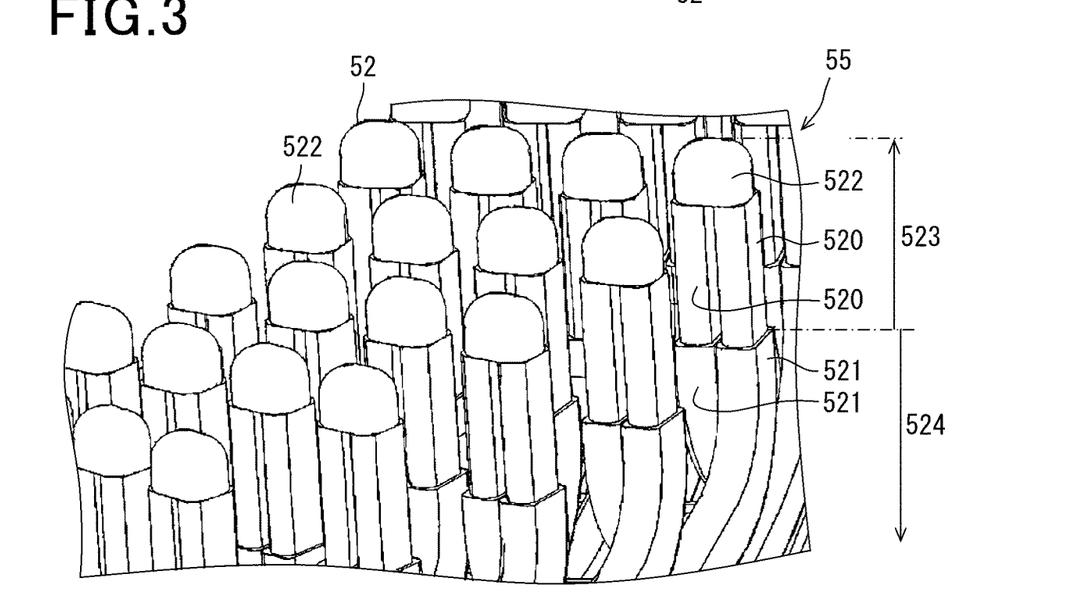
FIG. 3 is a perspective view showing a first coil end part of a stator coil of the stator.

As shown in FIG. 3, each of the electrical conductor segments forming the stator coil 52 includes an electrical conductor 520 and an insulating coat 521 covering the electrical conductor 520. The electrical conductor 520 is formed of a metal material having high electrical conductivity, such as copper. The electrical conductor 520 has a substantially rectangular cross section perpendicular to its longitudinal direction. The insulating coat 521 is formed of an electrically insulative resin material. More particularly, in the present embodiment, a polyimide resin is employed, in consideration of the heat resistance, as the material for forming the insulating coat 521. In addition, it should be noted that in FIG. 3, the first coil end part 55 is shown omitting the encapsulating resin body 60 therefrom.

In the stator coil 52, there are formed a plurality of joints. The joints formed in the stator coil 52 include joints each being formed between one pair of the electrical conductors 520 of the electrical conductor segments, joints each being formed between the electrical conductor 520 of one of the electrical conductor segments and one of the busbars (or bridging wires), and joints for electrically connecting the stator coil 52 to the control device.

More particularly, in the present embodiment, the joints formed in the stator coil 52 include welds 522 each of which is formed between the electrical conductors 520 of a corresponding pair of the electrical conductor segments that together constitute the same one of the phase coils. The welds 522 are included in the first coil end part 55 of the stator coil 52 and encapsulated in the encapsulating resin body 60. In addition, a joint for forming the neutral point of the stator coil 52 is also encapsulated in the encapsulating resin body 60.

Each of the electrical conductors 520 has exposed portions 523, which are exposed from the insulating coat 521 covering the electrical conductor 520, and a covered portion 524 that is covered with the insulating coat 521. The joints are formed at the exposed portions 523 of the electrical conductors 520. That is, part or the whole of each of the exposed portions 523 of the electrical conductors 520 is included in one of the joints. At least one of the first and second coil end parts 55 and 56 of the stator coil 52 includes, in addition to the covered portions 524 of the electrical conductors 520, the exposed portions 523 of the electrical conductors 520 and the joints formed at the exposed portions 523.

More particularly, in the present embodiment, the stator coil 52 is formed of a plurality of substantially U-shaped electrical conductor segments. At two opposite ends of each of the substantially U-shaped electrical conductor segments, the electrical conductor 520 is exposed from the insulating coat 521. In other words, the exposed portions 523 are provided at two opposite ends of each of the substantially U-shaped electrical conductor segments. Moreover, each of the substantially U-shaped electrical conductor segments is mounted on the stator core 51 to have both the opposite ends thereof protruding from the first axial end face 51a of the stator core 51. Furthermore, on the first axial end face 51a of the stator core 51, all the ends of the electrical conductor segments are arranged not only in circumferential alignment with one another around the axis AX but also in radial alignment with one another. That is, all the ends of the electrical conductor segments are arranged in a multiple annular shape.

For each radially-adjacent pair of the electrical conductors 520 of the electrical conductor segments, the exposed portions 523 of the pair of the electrical conductors 520 are welded to form one weld 522 therebetween. Consequently, the pair of the electrical conductors 520 are connected with each other. More particularly, in the present embodiment, only distal end parts of the exposed portions 523 of the pair of the electrical conductors 520 are welded to form the weld 522; the remaining parts of the exposed portions 523 constitute non-welded parts of the exposed portions 523. Moreover, a gap is formed between the non-welded parts of the exposed portions 523 of the pair of the electrical conductors 520.

In addition, in the present embodiment, each of the phase coils of the stator coil 52 is formed by welding a plurality of electrical conductor segments to one another; thus each of the phase coils has a plurality of welds 522 formed therein. All the welds 522 formed in the stator coil 52 are located on the first axial end face 51a side of the stator core 51. As shown in FIG. 3, every four welds 522 are arranged in radial alignment with each other.

Accordingly, in the present embodiment, the first coil end part 55 of the stator coil 52 includes, in addition to the covered portions 524 of the electrical conductors 520, the exposed portions 523 of the electrical conductors 520 and the welds 522 formed between the exposed portions 523. In contrast, the second coil end part 56 of the stator coil 52 includes the covered portions 524 of the electrical conductors 520, but no exposed portions 523 of the electrical conductors 520. All the joints including the welds 522 are formed in the first coil end part 55. That is, no joint is formed in the second coil end part 56. In addition, the second coil end part 56 is constituted of turn portions of the substantially U-shaped electrical conductor segments which respectively connect the straight portions of the electrical conductor segments. Those parts of the straight portions of the substantially U-shaped electrical conductor segments which are received in the slots 53 of the stator core 51 constitute the coil sides 54 of the stator coil 54. The coil sides 54 include no exposed portions 523. That is, all the coil sides 54 are formed of the covered portions 524 of the electrical conductors 520.

Figure 4:
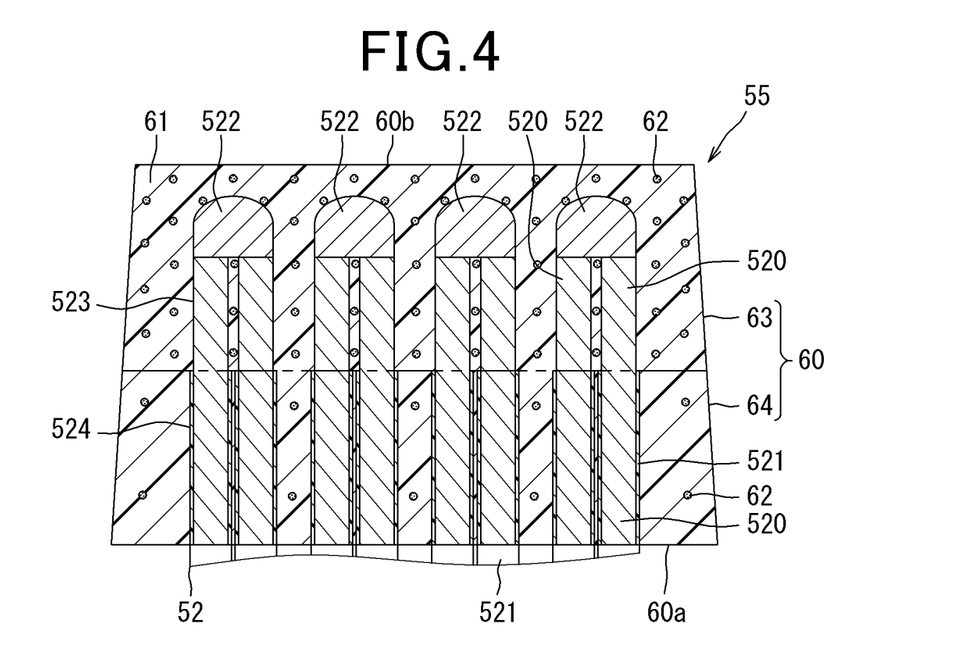
FIG. 4 is a cross-sectional view showing an encapsulating resin body in which part of the first coil end part is encapsulated.

The encapsulating resin body 60 has the joints (including the welds 523) encapsulated therein, thereby protecting them. More specifically, as shown in FIG. 4, at the first coil end part 55 of the stator coil 52, the encapsulating resin body 60 has integrally encapsulated therein the exposed portions 523 of the electrical conductors 520, the joints formed at the exposed portions 523, and at least part of each of the covered portions 524 of the electrical conductors 520 which respectively adjoin the exposed portions 523. That is, in the present embodiment, the encapsulating resin body 60 is provided on the same axial side of the stator core 51 as the first coil end part 55 of the stator coil 52. The encapsulating resin body 60 has integrally encapsulated therein all the joints formed in the stator coil 52 except for those formed at the connection terminals 52a of the phase coils of the stator coil 52. As shown in FIG. 2, the encapsulating resin body 60 is formed in a substantially annular shape.

Next, the structure of the encapsulating resin body 60 will be described in detail.

FIG. 4 shows a cross section of the encapsulating resin body 60 taken along a radial direction.

It should be noted that in FIG. 4, the size of a filler 62 included in the encapsulating resin body 60 is not shown at actual size, but adjusted to an easy-to-recognize size. The filler 62 is also interposed between each pair of the electrical conductor segments joined via one weld 522 formed therebetween. More specifically, the filler 62 is interposed between the non-welded parts of the exposed portions 523 of the electrical conductors 520 of the electrical conductor segments and between the insulating coats 521 of the electrical conductor segments.

The encapsulating resin body 60 is formed mainly of a resin 61 and the filler 62. The resin 61 is implemented by a curable resin, such as a thermosetting resin. The filler 62 is implemented by a filler having a lower coefficient of linear expansion than the rein 61, such as an inorganic filler. Further, the inorganic filler may be, for example, a silica-based filler or a glass filler.

More particularly, in the present embodiment, the resin 61 is implemented by an epoxy resin which is a thermosetting resin. The filler 62 is implemented by a silica-based filler. The encapsulating resin body 60 is substantially isotropic in coefficient of linear expansion.

As shown in FIG. 4, the encapsulating resin body 60 has a first part 63 and a second part 64. In the first part 63, there are encapsulated the exposed portions 523 of the electrical conductors 520 and the welds 522 formed between the exposed portions 523. In the second part 64, there is encapsulated at least part of each of the covered portions 524 of the electrical conductors 520 which respectively adjoin the exposed portions 523. The second part 64 is located in the axial direction closer than the first part 63 to the stator core 51. The encapsulating resin body 60 has integrally encapsulated therein all the welds 522 and the joint for forming the neutral point of the stator coil 52.

In addition, in FIG. 4, there are shown four welds 522 that are arranged in radial alignment with each other. In the present embodiment, the encapsulating resin body 60 has encapsulated therein only an exposed portion 523-side part of each of the covered portions 524 of the electrical conductors 520 which respectively adjoin the exposed portions 523.

The boundary between the exposed portions 523 and the covered portions 524 of the electrical conductors 520 in the axial direction coincides with the boundary between the first part 63 and the second part 64 of the encapsulating resin body 60 in the axial direction.

In FIG. 4, the boundary between the first part 63 and the second part 64 of the encapsulating resin body 60 in the axial direction is designated by a one-dot chain line. The first part 63 is located on the further side of the boundary from the first axial end face 51a of the stator core 51 while the second part 64 is located on the closer side of the boundary to the first axial end face 51a of the stator core 51. The first part 63 has encapsulated therein the welds 522 and the non-welded parts of the exposed portions 523 of the electrical conductors 520. In contrast, the second part 64 has encapsulated therein at least part of each of the covered portions 524 of the electrical conductors 520 which are covered with the respective insulating coats 521 and respectively adjoin the exposed portions 523.

The resin 61 and the filler 62 included in the first part 63 are of the same materials as the resin 61 and the filler 62 included in the second part 64. However, the coefficient of linear expansion $\alpha 1$ of the first part 63 is set to be lower than the coefficient of linear expansion $\alpha 2$ of the second part 64. Consequently, the coefficient of linear expansion $\alpha 1$ of the first part 63 is closer than the coefficient of linear expansion $\alpha 2$ of the second part 64 to the coefficient of the electrical conductors 520; the coefficient of linear expansion $\alpha 2$ of the second part 64 is closer than the coefficient of linear expansion $\alpha 1$ of the first part 63 to the coefficient of linear expansion of the insulating coats 521 respectively covering the electrical conductors 520.

In the present embodiment, the difference in coefficient of linear expansion between the first and second parts 63 and 64 of the encapsulating resin body 60 is realized by uneven distribution of the filler 62 in the encapsulating resin body 60. Specifically, the amount of the filler 62 included in the first part 63 is greater than the amount of the filler 62 included in the second part 64. That is, the percentage content of the filler 62 in the first part 63 is higher than the percentage content of the filler 62 in the second part 64. Moreover, the coefficient of linear expansion of the filler 62 (or molten silica) is lower than the coefficient of linear expansion of the resin 61 (or epoxy resin). Consequently, the coefficient of linear expansion $\alpha 1$ of the first part 63 is lower than the coefficient of linear expansion $\alpha 2$ of the second part 64.

The coefficient of linear expansion of the polyimide resin forming the insulating coats 521 of the electrical conductor segments is, for example, about 35 ppm/° C. (or $\times 10^{-6}$/° C.). Therefore, the coefficient of linear expansion $\alpha 2$ of the second part 64 of the encapsulating resin body 60 is preferably set to be in the range of 30-40 ppm/° C. Moreover, the coefficient of linear expansion of copper forming the electrical conductors 520 of the electrical conductor segments is, for example, about 18 ppm/° C. Therefore, the coefficient of linear expansion $\alpha 1$ of the first part 63 of the encapsulating resin body 60 is preferably set to be in the range of 13-23 ppm/° C.

Next, a method of manufacturing the rotating electric machine 10 according to the present embodiment, in particular a method of forming the encapsulating resin body 60 will be described with reference to FIGS. 5 and 6.

Figure 5:
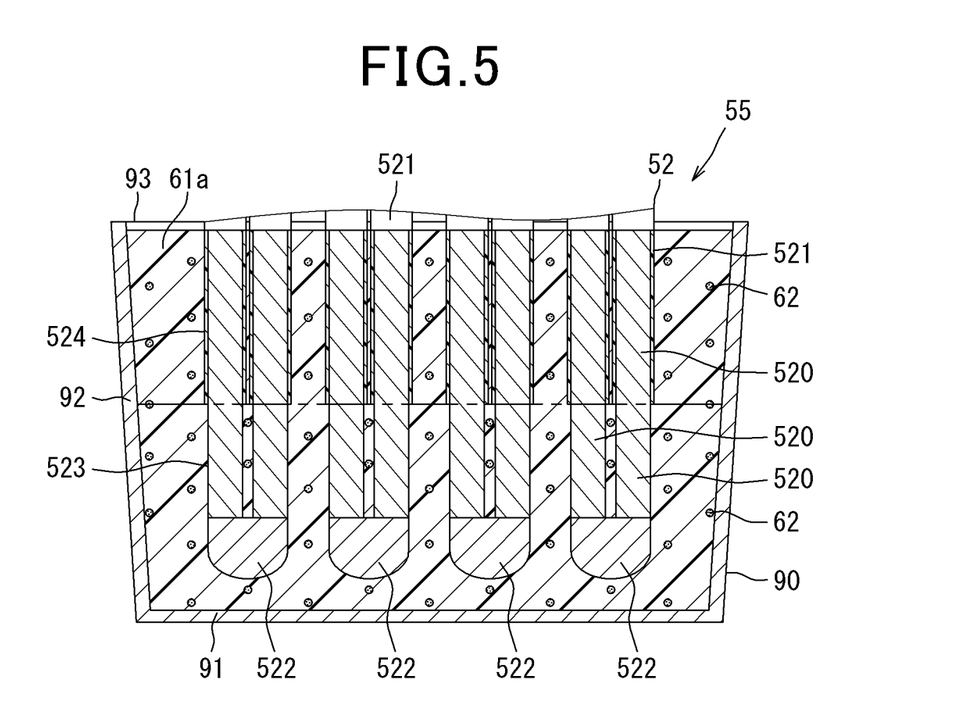
FIG. 5 is a cross-sectional view illustrating a method of manufacturing the rotating electric machine.
Figure 6:
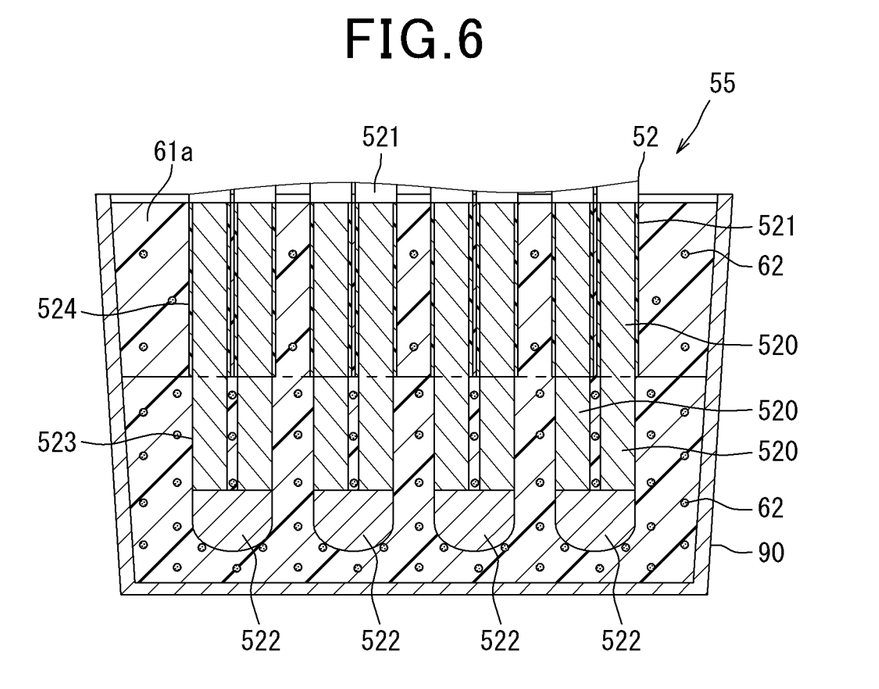
FIG. 6 is another cross-sectional view illustrating the method of manufacturing the rotating electric machine.

In addition, FIGS. 5 and 6 are cross-sectional views corresponding to FIG. 4. In each of FIGS. 5 and 6, the boundary between the exposed portions 523 and the covered portions 524 of the electrical conductors 520 in the axial direction is designated by a one-dot chain line as in FIG. 4.

The method of manufacturing the rotating electric machine 10 according to the present embodiment includes a mounting step, an immersing step, a curing step and an assembly step.

First, in the mounting step, the stator coil 52 is mounted to the stator core 51.

Specifically, in the present embodiment, the substantially U-shaped electrical conductor segments are inserted, from the second axial end face 51b side of the stator core 51, into the slots 53 of the stator core 51, thereby having both the ends of each of the substantially U-shaped electrical conductor segments protruding axially outward from the first axial end face 51a of the stator core 51. Then, for each radially-adjacent pair of the electrical conductors 520 of the electrical conductor segments, the exposed portions 523 of the pair of the electrical conductors 520 are welded to form one weld 522 therebetween. Moreover, the neutral terminals of the phase coils of the stator coil 52 are welded together. Consequently, the stator coil 52, which is formed of the substantially U-shaped electrical conductor segments, is mounted to the stator core 51.

In the immersing step, as shown in FIG. 5, at least part of the first coil end part 55 of the stator coil 52 is immersed in a liquid resin 61a having the filler 62 added thereto. The at least part of the first coil end part 55 immersed in the liquid resin 61a includes the exposed portions 523 of the electrical conductors 520, the joints formed at the exposed portions 523, and at least part of each of the covered portions 524 of the electrical conductors 520 which respectively adjoin the exposed portions 523. In addition, the liquid resin 61a is the uncured resin 61.

In the present embodiment, the liquid resin 61a is contained in a container 90 which has a flat bottom wall 91 and a tubular side wall 92. The bottom wall 91 is formed to close one end of the side wall 92. At the other end of the side wall 92, there is formed an opening 93. The container 90 is made of a metal material having high thermal conductivity. The container 90 is arranged to have the bottom wall 91 located vertically below the opening 93.

In this step, the liquid resin 61a and the filler 62 is first placed into the container 90. Then, the at least part of the first coil end part 55 of the stator coil 52 is immersed in the liquid resin 61a, which is contained in the container 90, from the welds 522 formed between the exposed portions 523 of the electrical conductors 520. Moreover, in this step, the filler 62 may be dispersed in the liquid resin 61a by agitating and mixing either before or after immersing the at least part of the first coil end part 55 of the stator coil 52 in the liquid resin 61a. In addition, even without agitating, the filler 62 can still be considerably dispersed in the liquid resin 61a during the placing of the liquid resin 61a and the filler 62 into the container 90 and during the immersing of the at least part of the first coil end part 55 in the liquid resin 61a.

Alternatively, in this step, the at least part of the first coil end part 55 of the stator coil 52 may be first placed into the container 90 from the welds 522 formed between the exposed portions 523 of the electrical conductors 520. Then, the liquid resin 61a and the filler 62 may be placed into the container 90, thereby immersing the least part of the first coil end part 55 of the stator coil 52 in the liquid resin 61a. Moreover, in this step, the filler 62 may be dispersed in the liquid resin 61a by agitating and mixing either before or after placing the liquid resin 61a and the filler 62 into the container 90. In addition, even without agitating, the filler 62 can still be considerably dispersed in the liquid resin 61a during the placing of the liquid resin 61a and the filler 62 into the container 90.

Upon completion of the immersing step, the filler 62 is substantially evenly distributed in the entire liquid resin 61a as shown in FIG. 5.

In the curing step, the liquid resin 61a is cured to form the encapsulating resin body 60.

Specifically, after the immersing step, the liquid resin 61a is left to stand in the container 90. Then, with passage of time, the filler 62 settles, in other words, moves vertically downward (i.e., moves in the axial direction away from the stator core 51). Consequently, after a predetermined duration has elapsed from the immersing step, the distribution of the filler 62 in the liquid resin 61a becomes uneven, as shown in FIG. 6, so that the amount of the filler 62 included in a first part of the liquid resin 61a is greater than the amount of the filler 62 included in a second part of the liquid resin 61a. Here, in the first part of the liquid resin 61a, there are immersed the exposed portions 523 of the electrical conductors 520 and the joints formed at the exposed portions 523; in the second part of the liquid resin 61a, there is immersed at least part of each of the covered portions 524 of the electrical conductors 520 which respectively adjoin the exposed portions 523. That is, the amount of the filler 62 included in the first part of the liquid resin 61a is increased while the amount of the filler 62 included in the second part of the liquid resin 61a is decreased.

At a time point after the predetermined duration has elapsed from the immersing step, i.e., with the distribution of the filler 62 in the liquid resin 61a having become uneven as described above, the liquid resin 61a is cured. As a result, the encapsulating resin body 60 is obtained.

More particularly, in the present embodiment, the liquid resin 61a is cured by a heating process, forming the encapsulating resin body 60 into the shape of the receiving space of the container 90. Thereafter, the encapsulating resin body 60, which has the at least part of the first coil end part 55 of the stator coil 52 encapsulated therein, is removed from the container 90.

In the assembly step, the housing 20, the rotating shaft 30, the rotor 40, and the stator 50 having the encapsulating resin body 60 formed integrally therewith are assembled in a predetermined sequence. As a result, the rotating electric machine 10 as shown in FIG. 1 is obtained.

According to the present embodiment, it is possible to achieve the following advantageous effects.

The rotating electric machine 10 according to the present embodiment includes the stator core 51, the stator coil 52 and the encapsulating resin body 60. The stator coil 52 is mounted on the stator core 51. The stator coil 52 is formed of the electrical conductors 520 and the insulating coats 521 respectively covering the electrical conductors 520. The encapsulating resin body 60 has part of the stator coil 52 encapsulated therein. Moreover, the stator coil 52 has the first coil end part 55 protruding from the first axial end face 51a of the stator core 51. The first coil end part includes the exposed portions 523 of the electrical conductors 520, which are exposed from the insulating coats 521, the joints formed at the exposed portions 523 of the electrical conductors 520, and the covered portions 524 of the electrical conductors 520 which are covered with the respective insulating coats 521 and respectively adjoin the exposed portions 523. The encapsulating resin body 60 is formed, at the first coil end part 55 of the stator coil 52, to integrally encapsulate therein the exposed portions 523 of the electrical conductors 520, the joints formed at the exposed portions 520, and at least part of each of the covered portions 524 of the electrical conductors 520. The encapsulating resin body 60 has the first part 63 in which the exposed portions 523 of the electrical conductors 520 are encapsulated and the second part 64 in which the at least part of each of the covered portions 524 of the electrical conductors 520 is encapsulated. The coefficient of linear expansion $\alpha 1$ of the first part 63 of the encapsulating resin body 60 is lower than the coefficient of linear expansion $\alpha 2$ of the second part 64 of the encapsulating resin body 60.

With the above configuration, it is possible to minimize the difference between the coefficient of linear expansion $\alpha 1$ of the first part 63 of the encapsulating resin body 60 and the coefficient of linear expansion of the electrical conductors 520. Consequently, it is possible to minimize thermal stress that is induced by the difference in coefficient of linear expansion between the first part 63 of the encapsulating resin body 60 and the exposed portions 523 of the electrical conductors 520 and acts on the joints including the welds 522 formed between the exposed portions 523. As a result, it is possible to suppress cracks from occurring in the joints.

Moreover, with the above configuration, it is also possible to minimize the difference between the coefficient of linear expansion $\alpha 2$ of the second part 64 of the encapsulating resin body 60 and the coefficient of linear expansion of the insulating coats 521. Consequently, it is possible to minimize thermal stress that is induced by the difference in coefficient of linear expansion between the second part 64 of the encapsulating resin body 60 and the insulating coats 521 and acts on the interfaces therebetween. As a result, it is possible to suppress peeling of the second part 64 of the encapsulating resin body 60 from the insulating coats 521 (i.e., interfacial peeling).

Accordingly, with the above configuration, it is possible to ensure high reliability of the rotating electric machine 10.

Moreover, in the present embodiment, the encapsulating resin body 60 includes the filler 62. The percentage content of the filler 62 in the first part 63 of the encapsulating resin body 60 is higher than the percentage content of the filler 62 in the second part 64 of the encapsulating resin body 60.

The coefficient of linear expansion of the encapsulating resin body 60 decreases with increase in the percentage content of the filler 62 in the encapsulating resin body 60. Therefore, with the above distribution of the filler 62 in the encapsulating resin body 60, it is possible to minimize the difference between the coefficient of linear expansion $\alpha 1$ of the first part 63 of the encapsulating resin body 60 and the coefficient of linear expansion of the electrical conductors 520; it is also possible to minimize the difference between the coefficient of linear expansion $\alpha 2$ of the second part 64 of the encapsulating resin body 60 and the coefficient of linear expansion of the insulating coats 521.

In addition, since the difference in coefficient of linear expansion between the first and second parts 63 and 64 of the encapsulating resin body 60 is realized by uneven distribution of the filler 62 in the encapsulating resin body 60, it is possible to form both the first and second parts 63 and 64 of the encapsulating resin body 60 with the same resin 61. Consequently, it is possible to simplify the constitution of the encapsulating resin body 60, thereby lowering the manufacturing cost.

In the present embodiment, the coefficient of linear expansion $\alpha 1$ of the first part 63 of the encapsulating resin body 60 is closer than the coefficient of linear expansion $\alpha 2$ of the second part 64 of the encapsulating resin body 60 to the coefficient of the electrical conductors 520; the coefficient of linear expansion $\alpha 2$ of the second part 64 is closer than the coefficient of linear expansion $\alpha 1$ of the first part 63 to the coefficient of linear expansion of the insulating coats 521 respectively covering the electrical conductors 520.

With the above configuration, it is possible to minimize the difference between the coefficient of linear expansion $\alpha 1$ of the first part 63 of the encapsulating resin body 60 and the coefficient of linear expansion of the electrical conductors 520; it is also possible to minimize the difference between the coefficient of linear expansion $\alpha 2$ of the second part 64 of the encapsulating resin body 60 and the coefficient of linear expansion of the insulating coats 521. Consequently, it is possible to minimize both thermal stress acting on the joints including the welds 522 formed between the exposed portions 523 of the electrical conductors 520 and thermal stress acting on the interfaces between the second part 64 of the encapsulating resin body 60 and the insulating coats 521. In the present embodiment, the joints formed at the exposed portions 523 of the electrical conductors 520 include the welds 522 each of which is formed by welding the distal end parts of the exposed portions 523 of one radially-adjacent pair of the electrical conductors 520. The encapsulating resin body 60 is also interposed between each radially-adjacent pair of the electrical conductors 520 encapsulated in the encapsulating resin body 60.

With the above configuration, for each radially-adjacent pair of the electrical conductors 520, there is a gap formed between the non-welded parts of the exposed portions 523 of the pair of the electrical conductors 520. Moreover, the gap is filled with the first part 63 of the encapsulating resin body 60. Therefore, if the difference in coefficient of linear expansion between the first part 63 of the encapsulating resin body 60 and the electrical conductors 520 was large, the gap would be forcibly expanded with expansion of the first part 63 of the encapsulating resin body 60, inducing stress that acts on the welds 522. In this regard, in the present embodiment, as described above, it is possible to minimize the difference between the coefficient of linear expansion $\alpha 1$ of the first part 63 of the encapsulating resin body 60 and the coefficient of linear expansion of the electrical conductors 520. Consequently, it is possible to suppress stress acting on the welds 522.

In addition, the gaps formed between the non-welded parts of the exposed portions 523 of the electrical conductors 520 are narrow. Compared to the case of coating the exposed portions 523 of the electrical conductors 520 and the welds 522 formed between the exposed portions 523 by applying a resin powder to them and heating and thereby melting the resin powder, it is easier to fill the gaps formed between the non-welded parts of the exposed portions 523 with the liquid resin 61a that has the filler 62 added thereto.

The method of manufacturing the rotating electric machine 10 according to the present embodiment includes the mounting step, the immersing step and the curing step. In the mounting step, the stator coil 52 is mounted to the stator core 51 so that the first coil end part 55 of the stator coil 52 protrudes from the first axial end face 51a of the stator core 51. The first coil end part 55 includes the exposed portions 523 of the electrical conductors 520, the joints formed at the exposed portions 523 of the electrical conductors 520, and the covered portions 524 of the electrical conductors 520 which are covered with the respective insulating coats 521 and respectively adjoin the exposed portions 523. In the immersing step, at least part of the first coil end part 55 of the stator coil 52 is immersed in the liquid resin 61a so that the exposed portions 523 of the electrical conductors 520 and the joints formed at the exposed portions 523 are immersed in the first part of the liquid resin 61a while at least part of each of the covered portions 524 of the electrical conductors 520 is immersed in the second part of the liquid resin 6a. The liquid resin 61a has the filler 62 added thereto and is contained in the container 90 that has the opening 93. In the curing step, the liquid resin 61a is cured, at the time point after the predetermined duration has elapsed from the immersing step, to form the encapsulating resin body 60 in which the at least part of the first coil end part 55 of the stator coil 52 is encapsulated. At the time point, the distribution of the filler 62 in the liquid resin 61a has become uneven so that the amount of the filler 62 included in the first part of the liquid resin 61a is greater than the amount of the filler 62 included in the second part of the liquid resin 61a.

With the above method, the liquid resin 61a is cured in a state where the amount of the filler 62 included in the first part of the liquid resin 61a is greater than the amount of the filler 62 included in the second part of the liquid resin 61a. Consequently, the percentage content of the filler 62 in the first part 63 of the resultant encapsulating resin body 60 is higher than the percentage content of the filler 62 in the second part 64 of the resultant encapsulating resin body 60. In the first part 63 of the encapsulating resin body 60, there are encapsulated the exposed portions 523 of the electrical conductors 520 and the joints formed at the exposed portions 523; in the second part 64 of the encapsulating resin body 60, there is encapsulated at least part of each of the covered portions 524 of the electrical conductors 520. As a result, with the above uneven distribution of the filler 62 in the encapsulating resin body 60, it is possible to minimize both thermal stress acting on the joints including the welds 522 formed between the exposed portions 523 of the electrical conductors 520 and thermal stress acting on the interfaces between the second part 64 of the encapsulating resin body 60 and the insulating coats 521. Accordingly, with the above method, it is possible to manufacture the rotating electric machine 10 which has high reliability.

The distribution of the filler 62 in the encapsulating resin body 60 is not limited to the example shown in FIG. 4, where the filler 62 is substantially evenly distributed in both the first and second parts 63 and 64 of the encapsulating resin body 60.

Alternatively, the filler 62 may be unevenly distributed in either or both of the first and second parts 63 and 64 of the encapsulating resin body 60. For example, the filler 62 may be unevenly distributed in the entire encapsulating resin body 60 so that the percentage content of the filler 62 in the encapsulating resin body 60 gradually increases in the axial direction from an axially inner surface (or stator core 51-side surface) 60a to an axially outer surface (or anti-stator core 51-side surface) 60b of the encapsulating resin body 60. In this case, the average percentage content of the filler 62 in the first part 63 of the encapsulating resin body 60 is higher than the average percentage content of the filler 62 in the second part 64 of the encapsulating resin body 60. In addition, except for the boundary area between the first and second parts 63 and 64 of the encapsulating resin body 60, the minimum percentage content of the filler 62 in the first part 63 is higher than the maximum percentage content of the filler 62 in the second part 64.

Similarly, the coefficient of linear expansion $\alpha 1$ may be uneven in the first part 63 of the encapsulating resin body 60; the coefficient of linear expansion $\alpha 2$ may be uneven in the second part 64 of the encapsulating resin body 60. For example, the entire encapsulating resin body 60 may be configured so that the coefficient of linear expansion of the encapsulating resin body 60 gradually decreases in the axial direction from the axially inner surface 60a to the axially outer surface 60b of the encapsulating resin body 60. In this case, the average coefficient of linear expansion $\alpha 1$ of the first part 63 of the encapsulating resin body 60 is lower than the average coefficient of linear expansion $\alpha 2$ of the second part 64 of the encapsulating resin body 60. In addition, except for the boundary area between the first and second parts 63 and 64 of the encapsulating resin body 60, the maximum coefficient of linear expansion $\alpha 1$ in the first part 63 is lower than the minimum coefficient of linear expansion $\alpha 2$ in the second part 64.

Moreover, the method of forming the encapsulating resin body 60 is not limited to the above-described method. For example, the encapsulating resin body 60 may alternatively be formed in two stages. In the first stage, the first part 63 of the encapsulating resin body 60 is formed with the liquid resin 61a which has a greater amount of the filler 62 added thereto. In the second stage, the second part 64 of the encapsulating resin body 60 is formed with the liquid resin 61a which has a less amount of the filler 62 added thereto. In each of the first and second stages, it is possible to cure the liquid resin 61a in a state where the filler 62 is substantially evenly distributed in the liquid resin 61a. Consequently, it is possible to have the coefficient of linear expansion $\alpha 1$ substantially even in the first part 63 of the encapsulating resin body 60 and the coefficient of linear expansion $\alpha 2$ substantially even in the second part 64 of the encapsulating resin body 60.

Second Embodiment

In the above-described first embodiment, the filer 62 is included in each of the first and second parts 63 and 64 of the encapsulating resin body 60.

Figure 7:
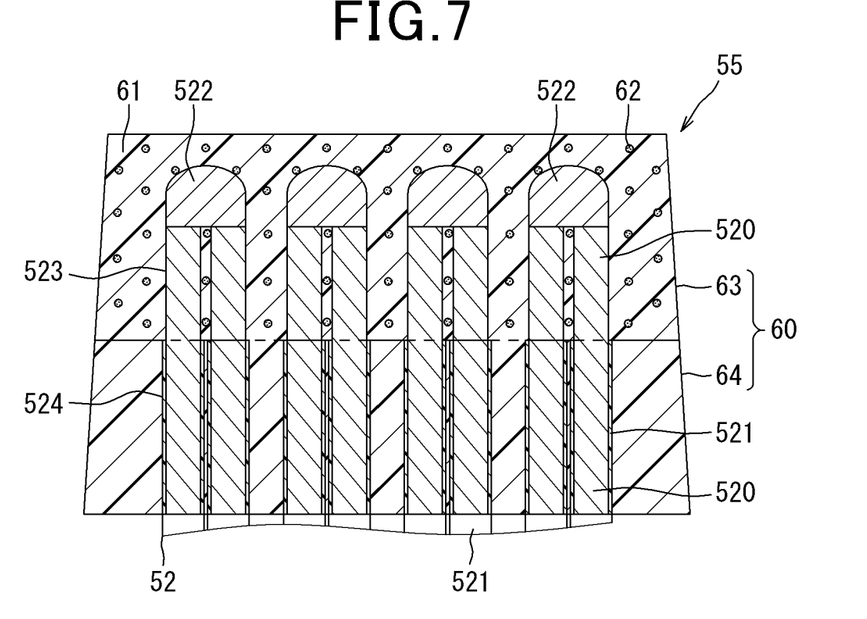
FIG. 7 is a cross-sectional view showing an encapsulating resin body of a rotating electric machine according to a second embodiment.

In contrast, in the second embodiment, as shown in FIG. 7, of the first and second parts 63 and 64 of the encapsulating resin body 60, the filler 62 is included in only the first part 63. That is, no filler 62 is included in the second part 64. On the other hand, the resin 61 included in the first part 63 is of the same material as the resin 61 included in the second part 64.

With the above configuration of the encapsulating resin body 60 according to the present embodiment, the percentage content of the filler 62 in the first part 63 is higher than the percentage content of the filler 62 in the second part 64 (i.e., 0%). Consequently, the coefficient of linear expansion $\alpha 1$ of the first part 63 is lower than the coefficient of linear expansion $\alpha 2$ of the second part 64.

The encapsulating resin body 60 according to the present embodiment may be formed using the same method as described in the first embodiment. However, to set the percentage content of the filler 62 in the second part 64 to be 0%, it is necessary to set the predetermined duration (i.e., the period of time from the end of the immersing step to the start of the heating process for curing the liquid resin 61a) to be sufficiently long.

Alternatively, the encapsulating resin body 60 according to the present embodiment may be formed in two stages. In the first stage, the first part 63 of the encapsulating resin body 60 is formed with the liquid resin 61a which has the filler 62 added thereto. In the second stage, the second part 64 of the encapsulating resin body 60 is formed with the liquid resin 61a which has no filler 62 added thereto.

Third Embodiment

In the above-described first embodiment, the entire encapsulating resin body 60 is formed of the resin 61. That is, the resin 61 included in the first part 63 of the encapsulating resin body 60 is of the same material as the resin 61 included in the second part 64 of the encapsulating resin body 60. Moreover, the difference in coefficient of linear expansion between the first and second parts 63 and 64 of the encapsulating resin body 60 is realized by uneven distribution of the filler 62 in the encapsulating resin body 60.

Figure 8:
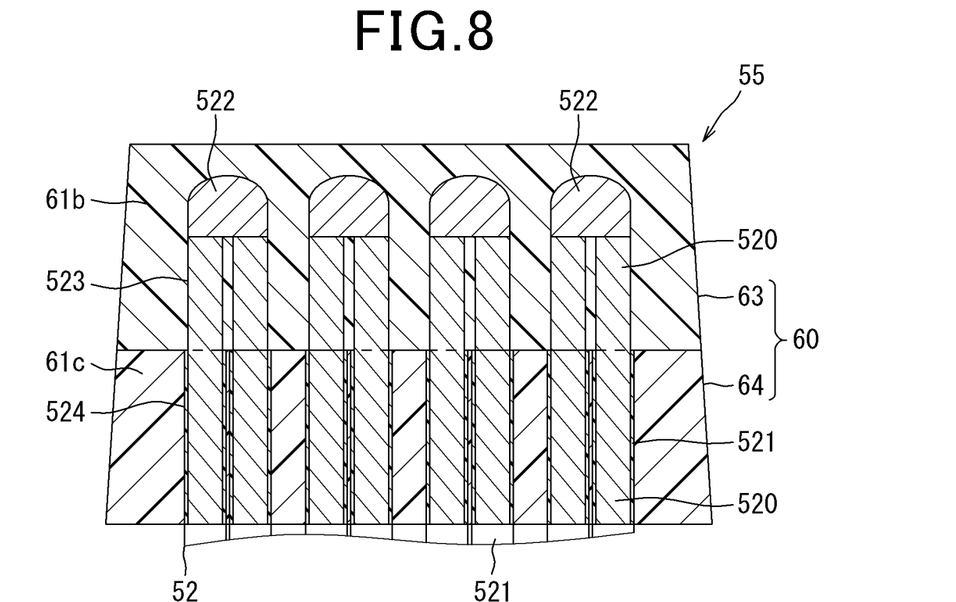
FIG. 8 is a cross-sectional view showing an encapsulating resin body of a rotating electric machine according to a third embodiment.

In contrast, in the third embodiment, as shown in FIG. 8, the first and second parts 63 and 64 of the encapsulating resin body 6 are respectively formed of two different resins 61b and 61c. The coefficient of linear expansion of the resin 61b forming the first part 63 of the encapsulating resin body 60 is lower than the coefficient of linear expansion of the resin 61c forming the second part 63 of the encapsulating resin body 60. Consequently, the coefficient of linear expansion $\alpha 1$ of the first part 63 is lower than the coefficient of linear expansion $\alpha 2$ of the second part 64.

In addition, the coefficient of linear expansion of the resin 61b is closer than the coefficient of linear expansion of the resin 61c to the coefficient of the electrical conductors 520; the coefficient of linear expansion of the resin 61c is closer than the coefficient of linear expansion of the resin 61b to the coefficient of linear expansion of the insulating coats 521 respectively covering the electrical conductors 520.

The encapsulating resin body 60 according to the present embodiment may be formed in two stages. In the first stage, the first part 63 of the encapsulating resin body 60 is formed with the resin 61b in a liquid state. In the second stage, the second part 64 of the encapsulating resin body 60 is formed with the resin 61c in a liquid state.

In addition, at least one of the first and second parts 63 and 64 of the encapsulating resin body 60 according to the present embodiment may include a filler 62 as described in the first embodiment.

Fourth Embodiment

In the above-described first embodiment, after the curing step, the resultant encapsulating resin body 60 is removed from the container 90 which is made of a metal material. That is, the container 90 does not constitute a part of the encapsulating resin body 60.

Figure 9:
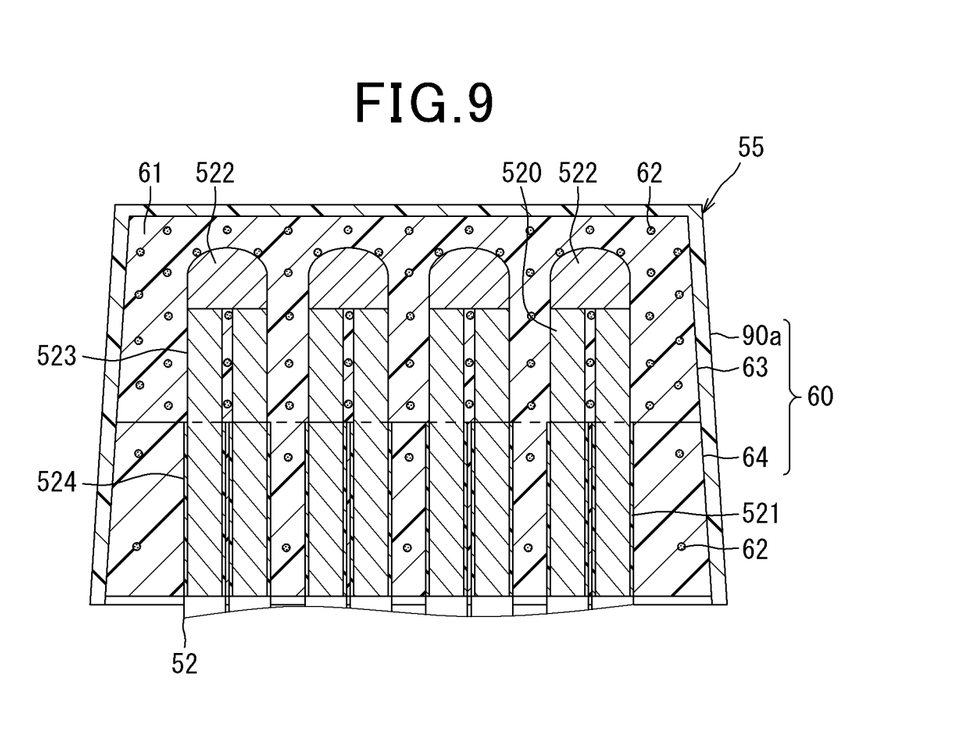
FIG. 9 is a cross-sectional view showing an encapsulating resin body of a rotating electric machine according to a fourth embodiment.

In contrast, in the fourth embodiment, as shown in FIG. 9, a container 90a, which is used for containing the liquid resin 61a, is made of a resin. Moreover, after the curing step, the container 90a is integrated with the cured resin 61 into one piece. Consequently, the resultant encapsulating resin body 60 includes the first part 63, the second part 64, and the resin-made container 90a in which both the first and second parts 63 and 64 are formed.

The coefficient of linear expansion of the container 90a is different from at least one of the coefficients of linear expansion of the first and second parts 63 and 64. In addition, the coefficient of linear expansion of the container 90a may be equal to either of the coefficients of linear expansion of the first and second parts 63 and 64.

As above, the encapsulating resin body 60 according to the present embodiment further includes, in addition to the first and second parts 63 and 64, a third part (i.e., the resin-made container 90a) whose coefficient of linear expansion is different from at least one of the coefficients of linear expansion of the first and second parts 63 and 64.

In addition, as described above, the encapsulating resin body 60 according to the present embodiment may be obtained by forming the first and second parts 63 and 64 in the resin-made container 90a.

Fifth Embodiment

In the above-described fourth embodiment, the encapsulating resin body 60 includes the resin-made container 90a as the third part in addition to the first and second parts 63 and 64.

Figure 10:
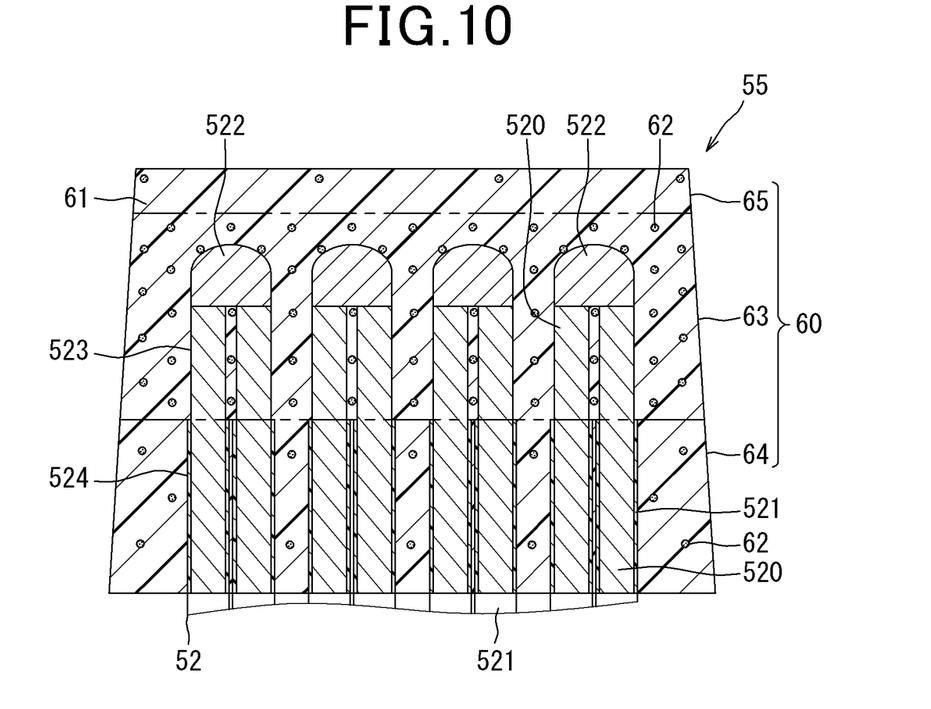
FIG. 10 is a cross-sectional view showing an encapsulating resin body of a rotating electric machine according to a fifth embodiment.

In contrast, in the fifth embodiment, as shown in FIG. 10, the encapsulating resin body 60 includes, in addition to the first and second parts 63 and 64, a third part 65 that is different from the resin-made container 90a described in the fourth embodiment.

Specifically, in the present embodiment, the second part 64, the first part 63 and the third part 65 of the encapsulating resin body 60 are arranged in this order from the stator core 51 side in the axial direction. In addition, in FIG. 10, the boundaries between these parts of the encapsulating resin body 60 in the axial direction are designated by one-dot chain lines.

The third part 65 is formed of the same resin 61 and filler 62 as the first and second parts 63 and 64. The percentage content of the filler 62 in the third part 65 is different from at least one of the percentage content of the filler 62 in the first part 63 and the percentage content of the filler 62 in the second part 64. Consequently, the coefficient of linear expansion of the third part 65 is different from at least one of the coefficients of linear expansion of the first and second parts 63 and 64.

More particularly, in the present embodiment, the percentage content of the filler 62 in the third part 65 is lower than the percentage content of the filler 62 in the first part 63. Consequently, the coefficient of linear expansion of the third part 65 is higher than the coefficient of linear expansion $\alpha 1$ of the first part 63.

The encapsulating resin body 60 according to the present embodiment may be formed in three stages. In the first stage, the third part 65 of the encapsulating resin body 60 is formed with the liquid resin 61a which has the filler 62 added thereto. In the second stage, the first part 63 of the encapsulating resin body 60 is formed, on the third part 65, with the liquid resin 61a which has the filler 62 added thereto. In the third stage, the second part 64 of the encapsulating resin body 60 is formed, on the first part 63, with the liquid resin 61a which has the filler 62 added thereto.

In addition, the encapsulating resin body 60 may further include a fourth part on the opposite side of the second part 64 to the first part 63 in the axial direction.

As above, the encapsulating resin body 60 may be configured to include three or more parts having different percentage contents of the filler 62. That is, the encapsulating resin body 60 may be configured to include three or more parts having different coefficients of linear expansion.

While the above particular embodiments have been shown and described, it will be understood by those skilled in the art that various modifications, changes, and improvements may be made without departing from the spirit of the present disclosure.

For example, the rotating electric machine 10 according to the first embodiment has the inner rotor structure where the rotor 40 is located radially inside the stator 50. However, the present disclosure can also be applied to rotating electric machines which have an outer rotor structure where a rotor is located radially outside a stator.

In the rotating electric machine 10 according to the first embodiment, the stator core 51 has the slots 53 formed therein; the coil sides 54 of the stator coil 52 are received in the slots 53 of the stator core 51. However, the present disclosure can also be applied to rotating electric machines where a stator coil is mounted on a slot-less stator core.

In the rotating electric machine 10 according to the first embodiment, of the first and second coil end parts 55 and 56 of the stator coil 52, the joints are included in only the first coil end part 55 and the encapsulating resin body 60 is formed at only the first coil end part 55 to encapsulate the joints therein. As an alternative, joints may be included in only the second coil end part 56 and an encapsulating resin body 60 may be formed at only the second coil end part 56 to encapsulate the joints therein. As another alternative, joints may be included in both the first and second coil end parts 55 and 56 and two encapsulating resin bodies 60 may be formed respectively at the first and second coil end parts 55 and 56 to encapsulate the joints therein.

In the rotating electric machine 10 according to the first embodiment, the stator coil 52 is configured with the substantially U-shaped electrical conductor segments each of which includes the electrical conductor 520 and the insulating coat 521 covering the electrical conductor 520. Alternatively, the stator coil 52 may have any other configuration such that: the stator coil 52 includes electrical conductors 520 and insulating coats 521 respectively covering the electrical conductors 520; and a coil end part 55 of the stator coil 52 includes exposed portions 523 of the electrical conductors 520, which are exposed from the insulating coats 521, joints 522 formed at the exposed portions 523 of the electrical conductors 520, and covered portions 524 of the electrical conductors 520 which are covered with the respective insulating coats 521 and respectively adjoin the exposed portions 523.

The shapes of the containers 90 and 90a and the encapsulating resin body 60 are not limited to those illustrated in the above-described embodiments. Instead, the containers 90 and 90a and the encapsulating resin body 60 may have any other suitable shapes.

In the above-described embodiments, the encapsulating resin body 60 is formed to be continuous in the circumferential direction (i.e., not divided in the circumferential direction). Alternatively, the encapsulating resin body 60 may be divided into a plurality of segments in the circumferential direction and each segment may have a plurality of joints integrally encapsulated therein.

In the above-described first embodiment, the resin 60 is implemented by a thermosetting resin. However, the resin 60 may alternatively be implemented by other curable resins.

What is claimed is:

1. A rotating electric machine comprising:
a stator core;
a stator coil mounted on the stator core, the stator coil being formed of electrical conductors and insulating coats respectively covering the electrical conductors; and
an encapsulating resin body having part of the stator coil encapsulated therein,
wherein
the stator coil has a coil end part protruding from an axial end face of the stator core,
the coil end part includes exposed portions of the electrical conductors, which are exposed from the insulating coats, joints formed at the exposed portions of the electrical conductors, and covered portions of the electrical conductors which are covered with the respective insulating coats and respectively adjoin the exposed portions,
the encapsulating resin body is formed, at the coil end part of the stator coil, to integrally encapsulate therein the exposed portions of the electrical conductors, the joints formed at the exposed portions, and at least part of each of the covered portions of the electrical conductors,
the encapsulating resin body has a first part in which the exposed portions of the electrical conductors are encapsulated and a second part in which the at least part of each of the covered portions of the electrical conductors is encapsulated, and
a coefficient of linear expansion of the first part of the encapsulating resin body is lower than a coefficient of linear expansion of the second part of the encapsulating resin body.

2. The rotating electric machine as set forth in claim 1, wherein the encapsulating resin body includes a filler, and
a percentage content of the filler in the first part of the encapsulating resin body is higher than a percentage content of the filler in the second part of the encapsulating resin body.

3. The rotating electric machine as set forth in claim 1, wherein the coefficient of linear expansion of the first part of the encapsulating resin body is closer than the coefficient of linear expansion of the second part of the encapsulating resin body to a coefficient of linear expansion of the electrical conductors, and
the coefficient of linear expansion of the second part of the encapsulating resin body is closer than the coefficient of linear expansion of the first part of the encapsulating resin body to a coefficient of linear expansion of the insulating coats respectively covering the electrical conductors.

4. The rotating electric machine as set forth in claim 1, wherein the encapsulating resin body further includes a third part in addition to the first and second parts, and
a coefficient of linear expansion of the third part is different from at least one of the coefficients of linear expansion of the first and second parts.

5. The rotating electric machine as set forth in claim 1, wherein the joints formed at the exposed portions of the electrical conductors comprise welds each of which is formed by welding distal end parts of the exposed portions of one adjacent pair of the electrical conductors, and
the encapsulating resin body is also interposed between each adjacent pair of the electrical conductors encapsulated in the encapsulating resin body.

6. A rotating electric machine comprising:
a stator core;
a stator coil mounted on the stator core, the stator coil being formed of electrical conductors and insulating coats respectively covering the electrical conductors; and
an encapsulating resin body having part of the stator coil encapsulated therein, the encapsulating resin body including a filler,
wherein
the stator coil has a coil end part protruding from an axial end face of the stator core,
the coil end part includes exposed portions of the electrical conductors, which are exposed from the insulating coats, joints formed at the exposed portions of the electrical conductors, and covered portions of the electrical conductors which are covered with the respective insulating coats and respectively adjoin the exposed portions,
the encapsulating resin body is formed, at the coil end part of the stator coil, to integrally encapsulate therein the exposed portions of the electrical conductors, the joints formed at the exposed portions, and at least part of each of the covered portions of the electrical conductors,
the encapsulating resin body has a first part in which the exposed portions of the electrical conductors are encapsulated and a second part in which the at least part of each of the covered portions of the electrical conductors is encapsulated, and
a percentage content of the filler in the first part of the encapsulating resin body is higher than a percentage content of the filler in the second part of the encapsulating resin body.

7. The rotating electric machine as set forth in claim 6, wherein the encapsulating resin body further includes a third part in addition to the first and second parts, and
a percentage content of the filler in the third part is different from at least one of the percentage content of the filler in the first part and the percentage content of the filler in the second part.

8. The rotating electric machine as set forth in claim 6, wherein the joints formed at the exposed portions of the electrical conductors comprise welds each of which is formed by welding distal end parts of the exposed portions of one adjacent pair of the electrical conductors, and
the encapsulating resin body is also interposed between each adjacent pair of the electrical conductors encapsulated in the encapsulating resin body.

9. A method of manufacturing a rotating electric machine, the method comprising the steps of:

mounting a stator coil to a stator core so that a coil end part of the stator coil protrudes from an axial end face of the stator core, the stator coil being formed of electrical conductors and insulating coats respectively covering the electrical conductors, the coil end part of the stator coil including exposed portions of the electrical conductors, which are exposed from the insulating coats, joints formed at the exposed portions of the electrical conductors, and covered portions of the electrical conductors which are covered with the respective insulating coats and respectively adjoin the exposed portions;

immersing at least part of the coil end part of the stator coil in a liquid resin so that the exposed portions of the electrical conductors and the joints formed at the exposed portions are immersed in a first part of the liquid resin while at least part of each of the covered portions of the electrical conductors is immersed in a second part of the liquid resin, the liquid resin having a filler added thereto and being contained in a container that has an opening; and curing the liquid resin, at a time point after a predetermined duration has elapsed from the immersing step, to form an encapsulating resin body in which the at least part of the coil end part of the stator coil is encapsulated, at the time point, distribution of the filler in the liquid resin having become uneven so that an amount of the filler included in the first part of the liquid resin is greater than an amount of the filler included in the second part of the liquid resin.

* * * * *